May 9, 1939.     J. J. P. VIGROUX     2,157,366
CLOSED BODY FOR AUTOMOTIVE VEHICLES
Filed Dec. 9, 1937

INVENTOR
Joseph, Jean, Pierre Vigroux
BY Maxwell E. Sparrow
ATTORNEY

Patented May 9, 1939

2,157,366

UNITED STATES PATENT OFFICE 2,157,366

CLOSED BODY FOR AUTOMOTIVE VEHICLES

Joseph Jean Pierre Vigroux, Ivry-sur-Seine, France

Application December 9, 1937, Serial No. 178,852
In France December 10, 1936

5 Claims. (Cl. 296—44)

The present invention deals with improvements relating to the construction of closed bodies particularly for automotive vehicles, such as disclosed in United States patent application, Serial No. 115,081, filed on December 10, 1936.

According to the present invention, both for the purpose of facilitating support of the roof, and of avoiding a rugged and therefore more costly construction, the fixed side glass plates are utilized, as is the fixed windshield transparent panel set forth in the above mentioned co-pending application, as supporting elements for the roof, thereby forming a rigid connection between the latter and the lower side walls of the closed bodies.

By means of this arrangement, the posts between the transparent side (panel section consisting of said door windows and side glass plates) can be eliminated in closed bodies, thereby offering the advantage of further increasing the visibility and the comfort of the passengers.

For example, and according to one embodiment of the invention given as a constructional example and described and illustrated in the co-pending application Serial No. 115,081, the fixed side glass plates forming part of the transparent side panel sections are made of thick glass called "safety glass", in which holes are provided, exactly as in the case of the windshield glass panel, to secure through said side glass plates the roof rigidly with the lower side walls of the body, bolts passing through said holes and being provided with resilient sheathings formed, for example, by a rubber tube or sheath having rubber flanges or washers. This enables the bolts to be suitably clamped on apppropriate brackets which in turn are fixed respectively on the lateral edges of the roof or on the side sills to which said edges are secured and also on the lower side walls of the body.

In a like manner, a similar method for releasably and resiliently mounting the rear glass panel may be provided, for supporting rigidly the rear edge of the roof and connecting the same rigidly to the rear wall of the body.

Figure 1:
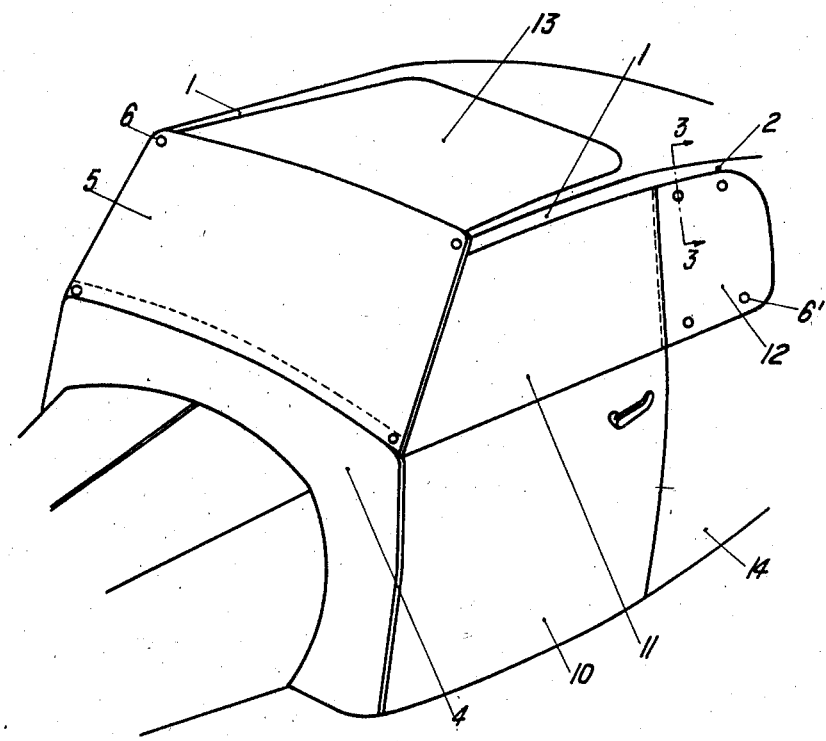
Fig. 1 is a diagrammatical perspective view of the whole arrangement of the essential parts of the body of a vehicle constructed in accordance with the invention.
Figure 2:
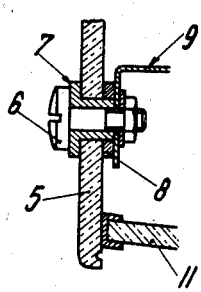
Fig. 2 shows, in section, the constructional details of the method of fixing the windshield glass panel.

Referring now to the drawing the numeral 1 designates the side sills which are supported at the rear by a support formed for example by the upper side walls 2, 13 is the sky panel, and 4 the dash-board of the body.

5 is the windshield made of thick glass known as "safety glass", in which are provided the holes enabling same to be fixed by means of bolts 6 provided with resilient sheathings formed by a flanged tube 7 and a rubber washer 8. This arrangement permits the bolt 6 to be suitably clamped on the brackets 9 secured to the sills 1 of the roof and to the dash-board 4 of the body, which is thus rigidly connected to said roof through the intermediary of the windshield glass 5 which braces them.

10 is one of the side doors and 11 its slidable side door window of which the front edge comes into register substantially with the edge of the windshield glass panel 5 and the rear edge registers with the front edge of each of the fixed side glass plates 12.

Said fixed side panels 12, which, according to the invention, are utilized as supporting and reinforcing elements for the vehicle roof and as a rigid connection or as a brace between same and the lower side walls 14, are mounted in the same manner as the windshield 5.

Figure 3:
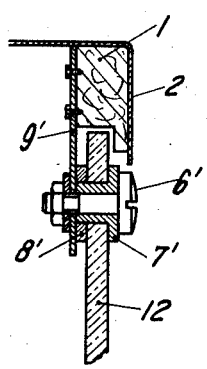
Fig. 3 shows, in section along the line 3—3 of Fig. 1, the constructional details of the method of mounting the fixed side glass plates.

For this purpose, they are each formed by a thick panel of glass known as "safety glass", in which holes are provided for the passage of fixing bolts 6' (Fig. 3) fitted with resilient sheathings which each comprises a flanged tube 7' and a rubber washer 8', so as to ensure the suitable clamping of the bolts 6' on brackets such as 9' which in turn are secured to the sills 1 and to the lower side walls 14 (Fig. 3).

Similarly, and in like manner, the same method of mounting with resilient sheathings can be utilized for the rear glass panels.

From the foregoing it can readily be seen, that there is herein provided according to the invention a novel body of an automotive vehicle having a roof, dash board, side doors and side walls, the said body comprising a frameless windshield attached to said roof and said dash-board, and a plurality of frameless transparent side panel sections, said sections including a set of slidable windows for said doors, and a set of side glass plates resiliently and detachably interfitted between said roof and said side walls, each of said windows abutting the rear face of said windshield and the front edge of its contiguous plate.

Having thus described my invention, what I claim as new and desire to secure by Letters Patent is:

1. A body for automotive vehicles provided with a frameless windshield attached to the roof and the dash-board and with a plurality of transparent side panel sections substantially supported by the side doors and walls of said vehicle, comprising in combination a set of movable side door windows, and a set of side glass plates adjacent said windows, said windows and plates forming parts of said sections, said plates being resiliently and detachably secured to said roof and said side walls, each of said windows adapted to abut the rear face of said windshield and the front edge of its contiguous plate.

2. A body for automotive vehicles provided with a frameless windshield attached to the roof and the dash-board and with a plurality of transparent side panel sections substantially supported by the side doors and walls of said vehicle, comprising a set of movable windows for said side doors, a set of side glass plates, and supporting means at said roof and said side walls for fixedly connecting said plates therewith, each of said windows adapted to abut the rear face of said windshield and the front edge of its contiguous plate.

3. In a body for automotive vehicles having a frameless windshield between the roof and the dash-board and provided with a plurality of transparent side panel sections substantially supported by the side doors and side walls of said vehicle respectively; the combination with a set of movable side door windows, of a set of side glass plates, and detachable connecting means at said roof and said side walls, said means projecting through said plates, each of said windows adapted to abut the rear face of said windshield and the front edge of its contiguous plate.

4. In a body for automotive vehicles having a frameless windshield between the roof and the dash-board and provided with a plurality of transparent side panel sections substantially supported by the side doors and side walls of said vehicle respectively; the combination with a set of movable side door windows, of a set of side glass plates provided with apertures, and means for resiliently and detachably uniting each of said plates with said roof and a respective side wall, said means including bolts extending through said apertures of said plates, each of said windows adapted to abut the rear face of said windshield and the front edge of its contiguous plate.

5. A body of an automotive vehicle having a roof, dash-board, side doors and side walls, comprising a frameless windshield attached to said roof and said dashboard, and a plurality of frameless transparent side panel sections, said sections including a set of slidable windows for said doors, and a set of side glass plates resiliently and detachably interfitted between said roof and said side walls, each of said windows abutting the rear face of said windshield and the front edge of its contiguous plate.

JOSEPH JEAN PIERRE VIGROUX.